US012743376B2

(12) United States Patent
Chourilov et al.

(10) Patent No.: US 12,743,376 B2
(45) Date of Patent: Sep. 22, 2026

(54) PROJECTING ALLOCATABLE CAPACITY FOR COMPUTE INSTANCES USING CACHED DATA

(71) Applicant: NetApp, Inc., San Jose, CA (US)

(72) Inventors: Vladislav Chourilov, Sderot (IL); Tal Shmuel Shafir, Yavne (IL); Ido Haskel, Kiryat Ono (IL); Roi Kramer, Ramat Gan (IL)

(73) Assignee: NetApp, Inc., San Jose, CA (US)

( * ) Notice: Subject to any disclaimer, the term of this patent is extended or adjusted under 35 U.S.C. 154(b) by 66 days.

(21) Appl. No.: 18/924,935

(22) Filed: Oct. 23, 2024

(65) Prior Publication Data

US 2026/0111362 A1 Apr. 23, 2026

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC ............. G06F 12/0871; G06F 12/0646; G06F 12/0891; G06F 12/123; G06F 3/0631; G06F 9/505; G06F 9/5016; G06F 2212/604; G06F 2212/601
See application file for complete search history.

(56) References Cited

U.S. PATENT DOCUMENTS 8,364,858 B1 * 1/2013 Martin .................. G06F 3/0607 710/36
12,265,860 B1 * 4/2025 Dorfman ............... G06F 9/5083
2012/0324092 A1 * 12/2012 Brown .................. G06F 9/5044 709/224
2020/0293446 A1 * 9/2020 Biswas ................. G06F 12/084

OTHER PUBLICATIONS

NPL: "How to stop getting rate limited by API" by Donnelly; disclosed in IDS filed on Mar. 13, 2025 (Year: 2023).*

* cited by examiner

*Primary Examiner* — Tracy C Chan

(57) ABSTRACT

The disclosure describes a node management service that determines to deploy a primary workload to a new instance in a compute cluster. The node management service projects an allocatable capacity for the new instance based on historical capacity data. The allocatable capacity is the amount of compute resources available for running the primary workload in the new instance after deployment of a supporting workload to the new instance. The node management service associates the primary workload with the new instance upon determining that the projected allocatable capacity is sufficient for running the primary workload.

19 Claims, 8 Drawing Sheets

PROJECTING ALLOCATABLE CAPACITY FOR COMPUTE INSTANCES USING CACHED DATA

BACKGROUND

In cloud-based computing environments, the resources allocated to instances, such as CPU and memory, are based on the capacity advertised by the compute provider for the instance type. However, the allocatable capacity (i.e., the actual resources available for running workloads on the instance) is often lower due to overhead from the Operating System (OS), node agent, hypervisors, and other supporting workloads that must run on the node. The gap between advertised and allocatable capacity makes it challenging to accurately predict how much of the node's resources will be available for workloads, as these overheads can vary across different customers, instance types, and workloads. Furthermore, the actual total capacity provided by a compute provider may sometimes differ from the total capacity advertised for the instance. Inaccurate predictions of allocatable capacity can lead to two main problems. First, if the system overestimates the allocatable capacity, there may not be enough resources to run the workload, causing failures or delays as the system attempts to reschedule or provision additional resources. On the other hand, if the system underestimates the allocatable capacity, it may overprovision resources, leading to inefficiencies and higher costs due to underutilized compute resources.

SUMMARY

The disclosure describes a node management service that projects the amount of allocatable capacity of a new instance to scale to a compute cluster. This projection is based on historical capacity data. Once the system determines that the projected allocatable capacity is sufficient to handle the primary workload, it proceeds to associate the workload with the new instance. The node management service thus predicts of allocatable capacity based on historical data, alleviating the above described issues.

DETAILED DESCRIPTION

Figure 1:
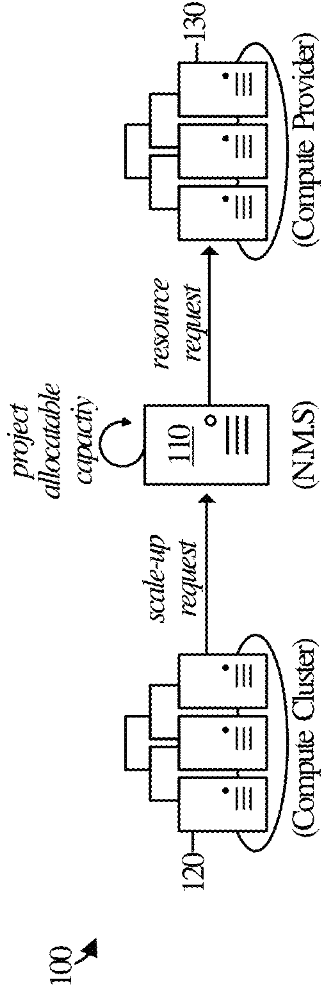
FIG. 1 illustrates a computing environment in an implementation.

The disclosure describes a node management service that predicts the allocatable capacity of a new instance in a compute cluster before deploying workloads. This allocatable capacity is the capacity available on a node for running a primary workload once a supporting workload (including, for example, a node agent, operating system, and hypervisor) has been deployed to the instance. The node management service leverages historical capacity data to project the resources available for running the primary workloads. By estimating the allocatable capacity in advance, the service provides that resources will be sufficient to run the workloads without overprovisioning or underutilizing the instance. This predictive approach addresses the challenges caused by variations in system overhead, such as the operating system and node agent, as well as differences in customer configurations and workload requirements.

Before deploying a primary workload to a new instance, the node management service projects the allocatable capacity for that instance using previously collected capacity data specific to the compute cluster or node group. First, the node management service checks whether there is an existing running instance of the same type within the node group or compute cluster. If such an instance is already running, the node management service uses the actual allocatable capacity of the running instance to project the allocatable capacity of the new instance. If no running instance of the same type exists, the system then checks a local cache, which stores previously recorded allocatable capacity data for instance types that have run in the same compute cluster or node group. If neither a running instance nor local cache data is available for the specific instance type, the node management service then falls back on the global cache. The global cache contains normalized capacity data collected from multiple customers across different environments and clusters. Finally, if there is no data available in the global cache, the node management service utilizes a predetermined formula to project the allocatable capacity.

Once the allocatable capacity is projected, the node management service compares this value to the resource requirements of the primary workload. If the projected allocatable capacity is sufficient, the system assigns the primary workload to the new instance. This ensures that the instance can accommodate the workload without running into resource shortages. Additionally, this predictive approach helps avoid overprovisioning, where too many compute resources are allocated, resulting in inefficiency and higher costs. The system thus optimizes resource usage, balancing the need for sufficient capacity to run workloads against the risk of wasted resources.

Various embodiments of the present technology provide for a wide range of technical effects, advantages, and/or improvements to computing systems and components. For example, various embodiments may include one or more of the following technical effects, advantages, and/or improvements: 1) non-routine and unconventional dynamic implementation of a node management service; 2) non-routine and unconventional operations for projecting resource allocation for instances and/or 3) non-routine and unconventional use of historical capacity data.

FIG. 1 illustrates computing environment 100 in an implementation. Computing environment 100 includes node management service 110, compute cluster 120, and compute provider 130. Node management service 110 is in communication with compute cluster 120 and compute provider 130.

Node management service 110 is representative of a software service that manages compute nodes in compute cluster 120. Node management service 110 may be, for example, Spot Ocean. Node management service 110 may be a cloud-based service utilized by customers running applications in compute cluster 120. Node management service 110 may be represented by node management service 710 of FIG. 7.

Node management service 110 is configured to project allocatable capacity of new instances for deployment to compute cluster 120. This allocatable capacity is the capacity is the compute capacity (including CPU and memory) available for running a primary workload (e.g., a workload including pods hosting containerized applications) after a supporting workload (e.g., the node agent, operating system, and hypervisor) has been deployed to the instance.

Node management service 110 scales up new instances to compute cluster 120 (e.g., in response to the scale-up request received from compute cluster 120). Node management service 110 projects an allocatable capacity for these new instances based on historical capacity data. Node management service 110 is configured to associate the primary workload with the new instance upon determining that the projected allocatable capacity is sufficient for running the primary workload. Node management service 110 submits a resource request to compute provider 130 to scale the new instance up in compute cluster 120.

Compute cluster 120 is representative of a distributed computing environment designed to run cloud-based applications, where workloads are deployed and managed by a control plane and executed across compute nodes provided by a cloud compute provider 130. Compute cluster 120 is configured to provide scale-up requests to node management service 110. These scale-up requests may request resources for running workloads (e.g., in case of deployment of new workloads or increased demand for existing workloads). Compute cluster 120 may be represented by compute cluster 720 of FIG. 7.

Compute provider 130 represents a provider of compute resources, including compute nodes for compute cluster 120. Examples of compute provider 130 include Amazon Web Services, Google Cloud, IBM Cloud, and others. Compute provider 130 offers various instance types, which node management service 110 can select to scale up compute nodes in compute cluster 120. Compute provider 130 may be represented by compute provider 730 of FIG. 7.

Figure 2:
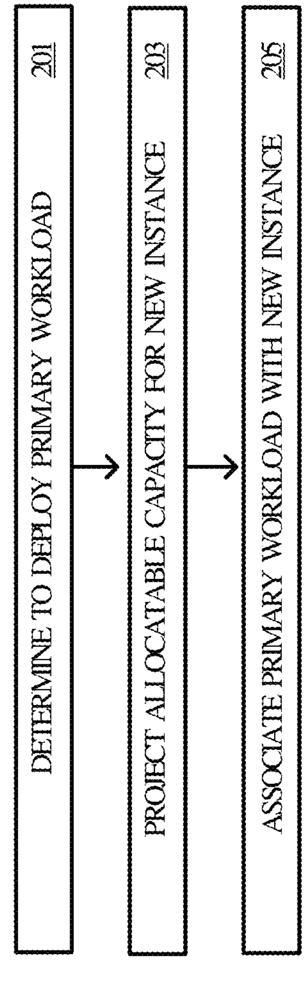
FIG. 2 illustrates a process for projecting resource allocation in an implementation.

FIG. 2 illustrates an allocation projection process performed by node management service 110, represented by process 200. Process 200 is employed by a computing device to provide node scaling, an example of which is provided by computing system 801 of FIG. 8. Process 200 may be implemented in program instructions (software and/or firmware) by one or more processors of the computing device. The program instructions direct the computing device to operate as follows, referring parenthetically to the steps in FIG. 2.

Node management service 110 determines to deploy a primary workload to a new instance in compute cluster 120 (step 201). This determination may be based, for example, on a request received from compute cluster 120 to scale resources for deployment of a new workload.

Node management service 110 projects an allocatable capacity for the new instance based on historical capacity data (step 203). The allocatable capacity is the amount of compute resources available for running the primary workload in the new instance after deployment of a supporting workload to the new instance.

Upon determining that the projected allocatable capacity is sufficient for running the primary workload, node management service 110 associates the primary workload with the new instance (step 205). Step 205 may include determining that the new instance is appropriately sized for the primary workload (i.e., the projected allocatable capacity is not overprovisioned or underprovisioned). Step 205 may also include obtaining the new instance from compute provider 130 for deployment to compute cluster 120 as a compute node. The use of historical capacity data in process 200 provides for appropriately sized compute nodes in compute cluster 120 and mitigates inefficiencies due to overprovisioning or underprovisioning.

Figure 3:
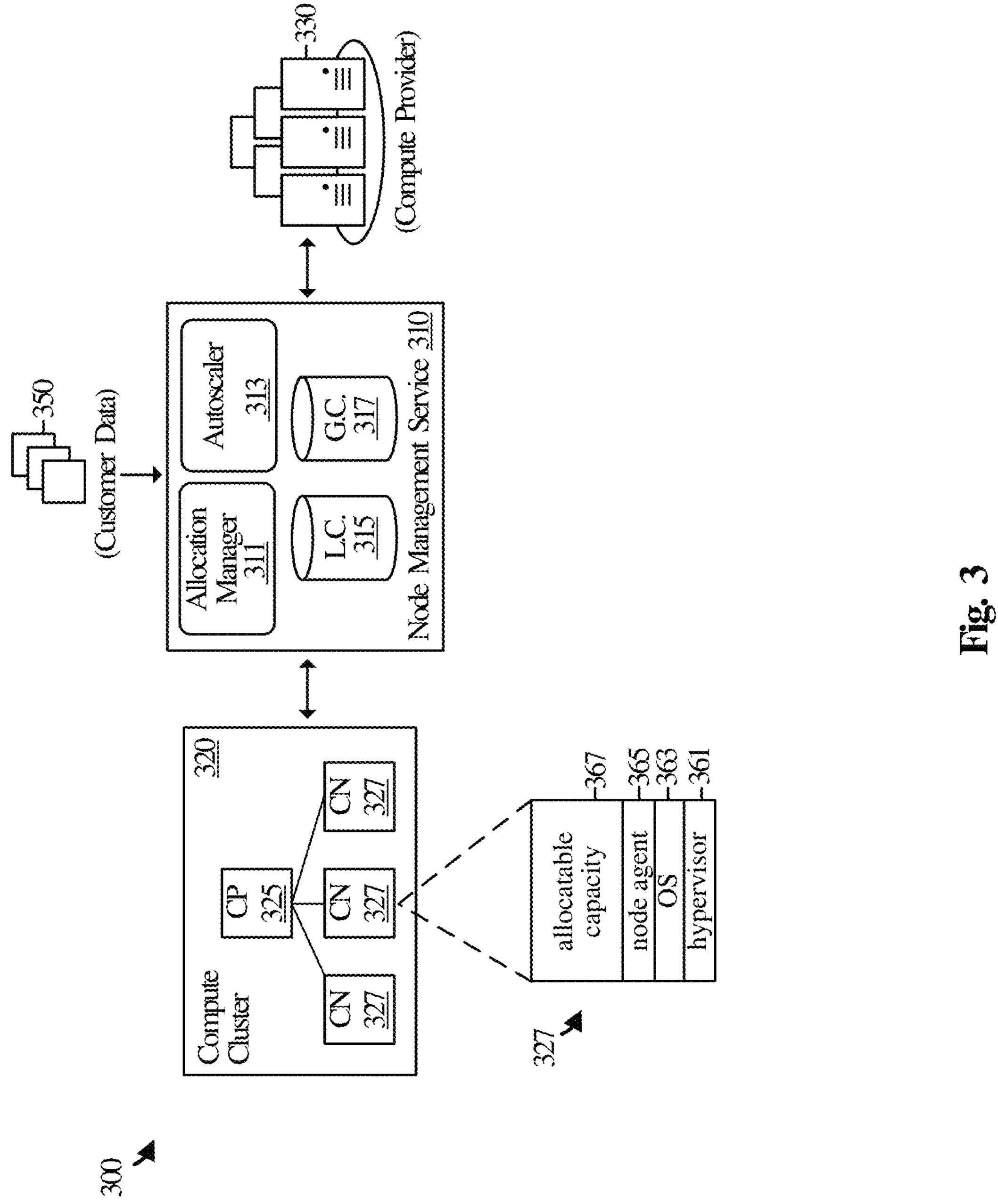
FIG. 3 illustrates another computing environment in an implementation.

FIG. 3 illustrates computing environment 300 in an implementation. Computing environment 300 includes node management service 310, compute cluster 320, and compute provider 330. Node management service 310 is in communication with compute cluster 320 and compute provider 330.

Compute cluster 320 includes control plane 325 and worker nodes 327. Compute cluster 320 (e.g., a Kubernetes cluster) may be represented by compute cluster 720 of FIG. 7. Control plane 325 is configured to manage the state of the compute cluster 320, including scheduling workloads, maintaining cluster state data, and managing communication between worker nodes 327. Worker nodes 327 are configured to run the primary workloads, where the primary workloads include pods hosting containerized applications. Worker nodes 327 may be organized into one or more virtual node groups within the compute cluster 320. A virtual node group is a logical grouping of worker nodes, often sharing similar configurations or characteristics, such as sharing the same instance type or operating system.

Worker nodes 327 are equipped with a supporting workload, which may include including operating system (OS) 363, node agent 365 (e.g., Kubelet), and hypervisor 361. The remaining resources form the allocatable capacity 367, which represents the compute resources (e.g., CPU and memory) available for running primary workloads.

Node agent 365, (e.g., Kubernetes Kubelet), is configured to report the allocatable capacity of each worker node 327. It regularly monitors and calculates the resources being used by the supporting workloads, and then reports the remaining allocatable capacity to the control plane 325. Control plane 325, which manages the overall state of compute cluster 320, forwards the allocatable capacity data received from node agent 365 to the node management service 310, which in turn uses the data to update local cache 315 and make autoscaling determinations, as explained further below.

Node management service 310 is configured to manage resource allocation and scaling within compute cluster 320. Node management service 310 may be represented by node management service 710 of FIG. 7. Node management service includes allocation manager 311, autoscaler 313, local cache 315, and global cache 317.

Allocation manager 311 is configured to maintain local cache 315 and global cache 317, which store allocatable capacity data. This data is used by autoscaler 313 to make scaling determinations, as explained in detail in the discussion of process 500 below. Local cache 315 contains measured allocatable capacity data received from control plane 325 for worker nodes 327 in compute cluster 320. Local cache 315 is specific to a particular virtual node group running in compute cluster 320, and may include actual allocatable capacity data for multiple different instance types for worker nodes 327 in the virtual node group. It is noted that different virtual node groups may have distinct characteristics; for example, virtual node groups may utilize different operating systems, with each OS having varying resource requirements. Maintaining a local cache specific to each virtual node group ensures that the allocation data is tailored to the configurations and resource demands within that particular group. FIG. 3 illustrates one local cache 315 for clarity. However, where compute cluster 120 includes multiple virtual node groups, node management service 310 may maintain multiple local caches 315. The maintenance of local cache 315 is described in greater detail below in relation to process 400 of FIG. 4.

Allocation manager 311 also maintains global cache 317, which stores allocatable capacity data aggregated from multiple customer environments, as represented by customer data 350. Global cache 317 updated periodically (e.g., every 24 hours) based on data from a predetermined number of customer organizations (e.g., 100 organizations). These customer organizations may be customers that run large scale applications utilizing a variety of instance types. To add or update allocation data in global cache 317 for a given instance type, allocation manager 311 may round down the allocatable capacity data (of customer data 350) to a predetermined increment. For example, memory values may be rounded down to the nearest 100 MB increment, such that values 101 MB and 190 MB are rounded down to 100 MB. Allocation manager 311 then identifies the most common allocatable capacity value (including both memory and CPU in some implementations) for the given instance type across the customer organizations and updates global cache 317 with this value.

Autoscaler 313 is responsible for identifying and provisioning new nodes to scale up in response to scale-up requests from the compute cluster 320. These requests may be triggered when the cluster needs to accommodate a new workload or scale up the size of an existing workload due to increased resource demands. Upon receiving such a request, autoscaler 313 initiates the process of identifying a new instance from the compute provider 330 to meet the cluster's needs.

To ensure that the new instance is appropriately sized (i.e., neither overprovisioned nor underprovisioned), autoscaler 313 leverages actual data from compute cluster 120, and the data stored in the local cache 315 and global cache 317. The utilization of this data is described in greater detail in relation to process 500 of FIG. 5.

If the projected allocatable capacity is determined to be sufficient (i.e., the new instance is not overprovisioned or underprovisioned) autoscaler 313 proceeds with the scaling process, provisioning the new instance from the compute provider 330 and integrating it into the compute cluster 320. This approach allows autoscaler 313 to dynamically adjust the compute cluster's capacity while maintaining optimal resource utilization.

Compute provider 330 is responsible for supplying the necessary infrastructure, including the provisioning of new instances, in response to scale-up requests from compute cluster 320. Compute provider 330 may be represented by compute provider 730 of FIG. 7. Compute provider 330 offers a wide variety of instance types, each of which is advertised with specific capacity. The advertised capacity for each instance type is determined by the compute provider and typically includes a total amount of CPUs and RAM. As noted above, the allocatable capacity of these instances once deployed to compute cluster 320 is less than advertised capacity due to the overhead of necessary system processes, such as the operating system (OS), node agent (e.g., Kubernetes Kubelet), and other supporting workloads.

Figure 4:
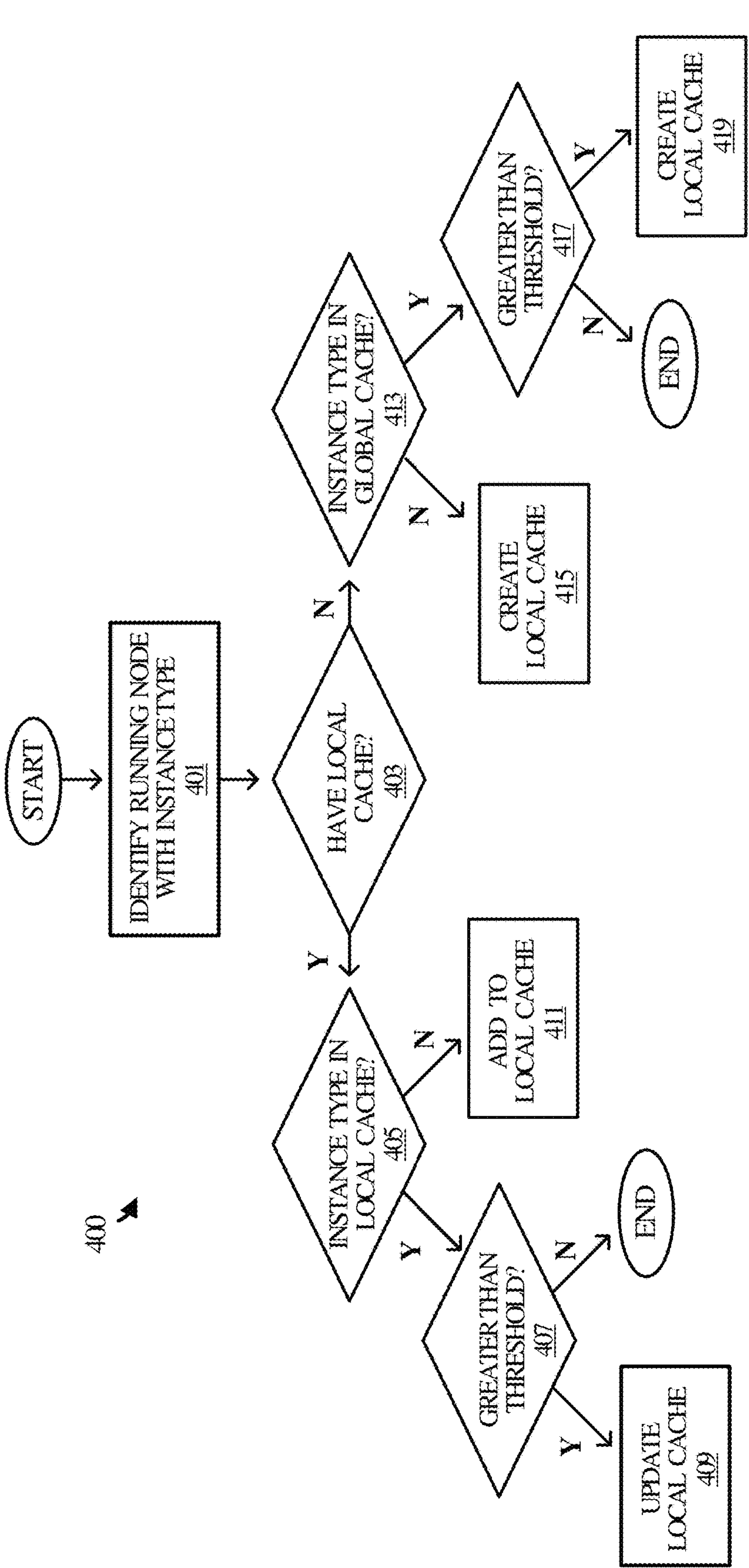
FIG. 4 illustrates a process for maintaining allocation data in an implementation.

FIG. 4 illustrates a process performed by node management service 310 (in particular allocation manager 311), represented by process 400. Process 400 is employed by a computing device, an example of which is provided by computing system 801 of FIG. 8. Process 400 may be implemented in program instructions (software and/or firmware) by one or more processors of the computing device. Process 400 is a process for creating and updating local cache 315. The program instructions direct the computing device to operate as follows, referring parenthetically to the steps in FIG. 4.

Node management service 310 identifies a running worker node 327 in a virtual node group of compute cluster 320 (step 401). The worker node 327 has an instance type (e.g., c5 medium, m5 large, among many other instance types provided by compute provider 330). Node management service 310 utilizes the actual allocatable capacity of the worker node to maintain local cache 315, as discussed in the steps below.

Node management service 310 determines if the virtual node group of worker node 327 has a local cache (step 403). It is noted that a local cache may not yet be created, for example, if the virtual node group is new or if the global cache values are accurate.

If it is determined that a local cache exists at step 403, node management service 310 determines if there is allocation data for the worker node's instance type in local cache 315 (step 405). If there is not allocation data for the instance type, node management service 310 adds the actual allocation data for the worker node 327 (received from control plane 325) to local cache 315 in association with the instance type (step 411).

If it is determined that there is data for the instance type in local cache 315, node management service 310 determines if a difference between the value in local cache 315 and the actual allocatable capacity data for worker node 327 exceeds a predetermined threshold (step 407). This determination may be made for both memory (for which the threshold may be, for example, 20 MB) and CPU (for which the threshold may be, for example, 10 millicores). If the difference (e.g., for either the memory or the CPU) exceeds the threshold, node management service 310 updates local cache 315 with the allocatable capacity for the currently running worker node 327 (step 409). If the difference does not exceed a threshold, process 400 ends (i.e., local cache 315 is not updated since the current value is considered to be accurate).

Returning to step 403, if node management service 310 determines that there is no local cache, node management service 310 proceeds to determine if there is allocatable capacity data for the instance type in global cache 317 (step 413). If there is no data for the instance type in global cache 317, node management service 310 proceeds to create a local cache (step 415). Step 415 may further include adding actual allocatable capacity data for worker node 327 to the newly created local cache 315.

If it is determined that there is allocation data in global cache 317 at step 413, node management service 310 determines if a difference between the value in global cache 317 and the actual allocatable capacity data for worker node 327 exceeds a predetermined threshold (step 417). This determination may be made for both memory (for which the threshold may be, for example, 20 MB) and CPU (for which the threshold may be, for example, 10 millicores). If the difference (e.g., for either the memory or the CPU) exceeds the threshold, node management service 310 proceeds to create a local cache (step 419). Step 419 may further include adding actual allocatable capacity data for worker node 327 to the newly created local cache 315. If the difference does not exceed a threshold, process 400 ends (i.e., a local cache is not created since the value in global cache 317 is considered to be accurate).

Figure 5:
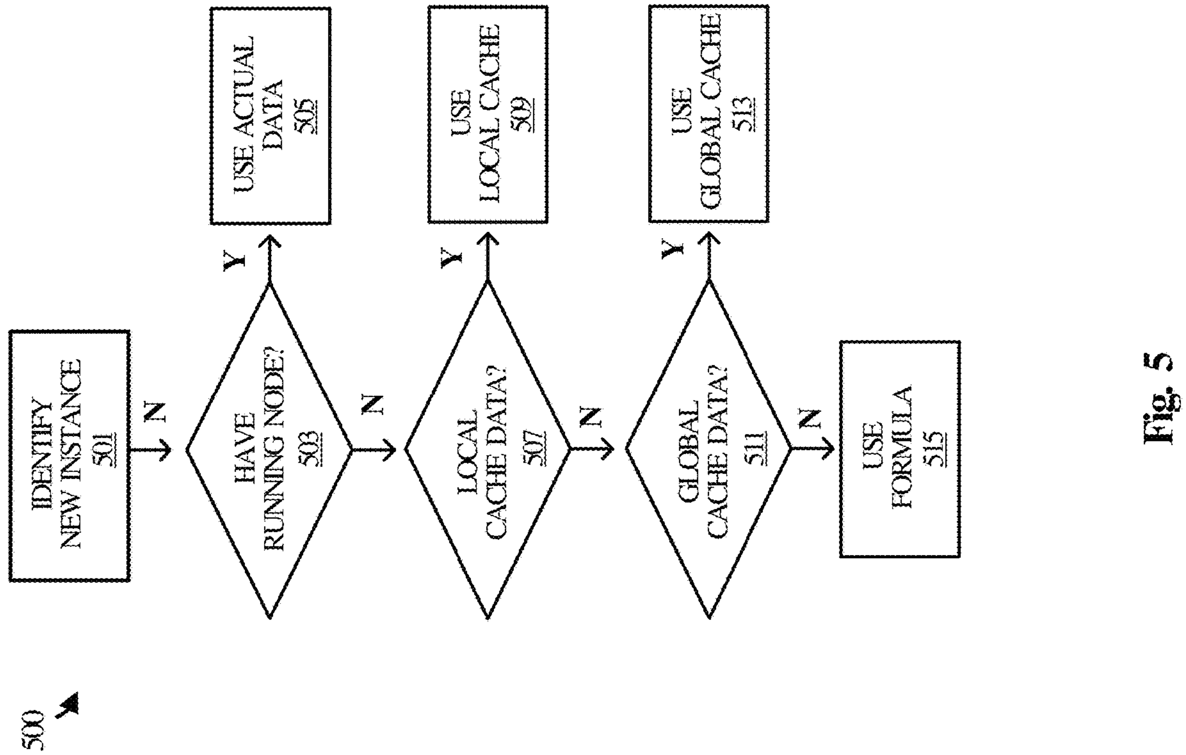
FIG. 5 illustrates another process for projecting resource allocation in an implementation.

FIG. 5 illustrates a process performed by node management service 310 (in particular autoscaler 313), represented by process 500. Process 500 is employed by a computing device, an example of which is provided by computing system 801 of FIG. 8. Process 500 may be implemented in program instructions (software and/or firmware) by one or more processors of the computing device. The program instructions direct the computing device to operate as follows, referring parenthetically to the steps in FIG. 5.

Node management service 110 identifies a potential new instance to scale up in compute cluster 320 (step 501). Node management service 110 proceeds to determine if a projected allocatable capacity for the new instance is appropriate for a pending workload to scale up, as explained below.

Node management service 110 determines if there is a running worker node 327 with the same instance type as the potential new instance (step 503). If there is such a worker node 327, node management service uses the actual allocatable capacity data of worker node 327 as the projected allocatable capacity of the potential new instance.

If it is determined that there is no currently running worker node 327 with the same instance type, node management service 310 determines if there is allocation data for the instance type in local cache 315 (step 507). If there is data in local cache 315, node management service 310 uses the local cache data as the projected allocatable capacity (step 509).

If it is determined that there is no allocation data in local cache 315, node management service 310 determines if there is allocation data for the instance type in global cache 317 (step 511). If there is data in global cache 317, node management service 310 uses the global cache data as the projected allocatable capacity (step 513).

If it is determined that there is no allocation data in global cache 317, node management service 310 uses a predetermined formula to calculate the projected allocatable capacity (step 515). This formula may calculate the allocatable capacity using various calculation methods (e.g., as a fixed percentage of the advertised capacity of the new instance).

Once autoscaler 313 has projected the allocatable capacity (in step 505, 509, 513, or 515) autoscaler 313 determines if the projected allocatable capacity is appropriate for the pending workload. In particular, if autoscaler 313 determines that the new instance is not overprovisioned or underprovisioned (by comparing the requirements of the workload with the projected allocatable capacity), autoscaler associates the workload with the new instance, and scales up the new instance in compute cluster 320 for deployment. If autoscaler 313 determines that the new instance is overprovisioned or underprovisioned it selects a different potential new instance type, and repeats process 500 for the new instance type.

Figure 6:
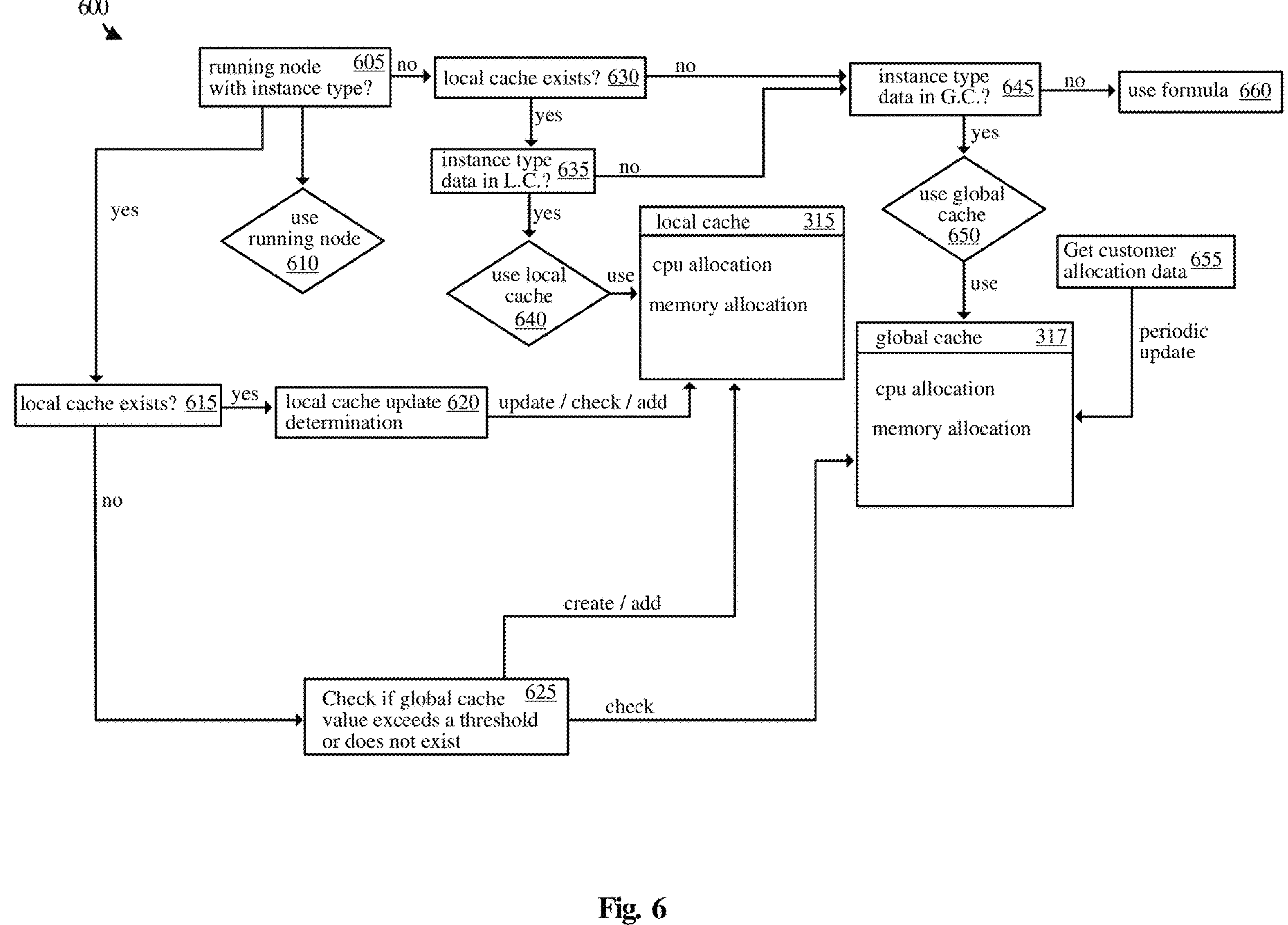
FIG. 6 illustrates a process for operating a node management service in an implementation.

FIG. 6 illustrates a process performed by node management service 310, represented by process 600. Process 600 is employed by a computing device, an example of which is provided by computing system 801 of FIG. 8. Process 600 may be implemented in program instructions (software and/or firmware) by one or more processors of the computing device. The program instructions direct the computing device to operate as follows, referring parenthetically to the steps in FIG. 6.

Node management service 310 identifies a running worker node 327 with an instance type in a virtual node group of compute cluster 320 (step 605). If there is such a running node, node management service 310 uses the allocation data for the running node in autoscaling decisions (step 610, and as further described above in step 509 of process 500) and determines if a local cache for the virtual node group exists (step 615). If the local cache does exist, node management service 310 determines if local cache 315 needs to be updated (step 620). This may include comparing the allocation value in local cache 315 with the actual allocation data from the running node, and identifying whether data for the instance type is in local cache 315. Local cache 315 is then updated accordingly, as described in detail in process 400 above. If a local cache does not exist, node management service 310 proceeds to check if a value in global cache 317 exceeds a threshold or does not exist (step 625). If the value exceeds a threshold or does not exist, node management service 310 creates local cache 315 and adds actual allocation from the running worker node 327 to local cache 315.

If it is determined at step 605 that there is not a running worker node with a particular instance type, node management service 310 checks if a local cache exists (step 630), in order to obtain allocation data for autoscaling determinations. If local cache 315 exists, node management service 310 checks if there is allocatable capacity data for the instance type in local cache (step 635). If there is data in local cache 315, node management service 310 uses this data for its autoscaling decision (step 640). If there is no local cache or no data for the instance type, node management service 310 checks if there is allocatable capacity data for the instance type in global cache 317 (step 645). If there is data in global cache 317, node management service 310 uses this data for its autoscaling decision (step 650). If there is no data for the instance type in global cache 317, node management service 310 utilizes a predetermined formula (step 660, and as described in detail above with respect to step 515 of process 500). Node management service 310 also obtains customer data 655, and periodically updates global cache 317 based on the customer data, as described in detail above in the discussion of FIG. 3.

Figure 7:
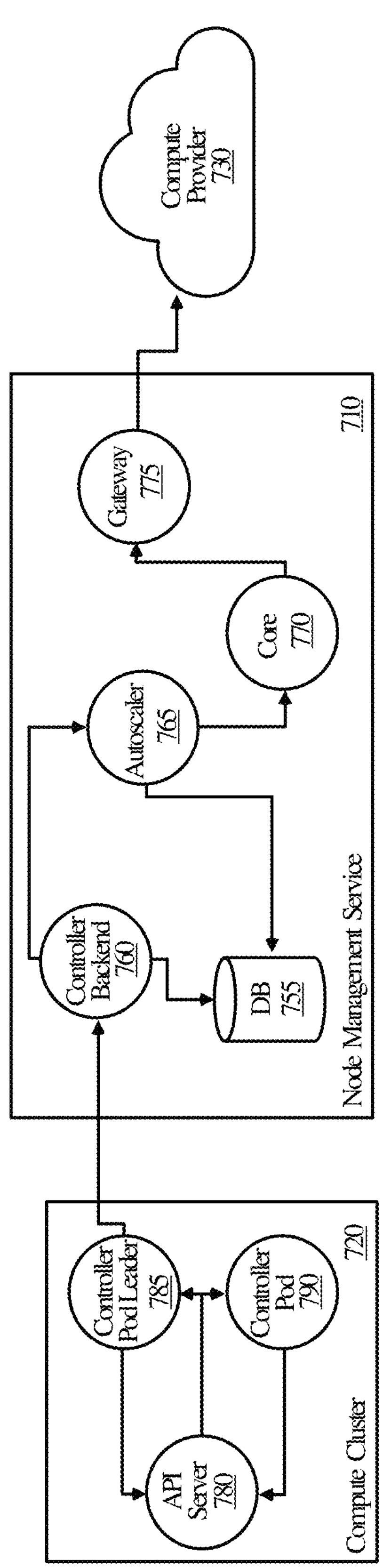
FIG. 7 illustrates a computing environment in an implementation.

FIG. 7 illustrates computing environment 700, which is representative of any system or collection of systems in which the various applications, processes, services, and scenarios disclosed herein may be implemented. Computing environment 700 includes node management service 710, compute cluster 720, and compute provider 730. These components perform various tasks to manage computational resources dynamically, leveraging a cloud-based infrastructure for containerized workloads managed by an orchestration service (such as Kubernetes).

Compute cluster 720 is a computing environment where applications run in containers managed by an orchestration platform such as Kubernetes. Computer cluster 720 includes control plane elements: API server 780, controller pod 790, and controller pod leader 785, which work together to manage and control the state of the workloads. In addition to these control plane components, the compute cluster 720 also includes compute nodes. Compute nodes are the machines (virtual or physical) where the application workloads are deployed and executed. Each compute node in the cluster runs hosts one or more pods of a workload, each containing one or more containers. The controller pod leader 785 and controller pod 790 communicate with the compute nodes through the API server 780, ensuring that the pods are appropriately scheduled and deployed on available worker nodes.

The compute nodes constantly report their status to the control plane, enabling API server 780 to monitor resource utilization and health. Based on these metrics, the controller pod leader 785 may trigger actions such as scaling up the number of pods or provisioning additional worker nodes by interacting with external components such as the Node Management Service 710. This enables dynamic and automated scaling of workloads, ensuring efficient resource utilization and availability.

API server 780 is responsible for internal communication within the Kubernetes cluster, managing control plane traffic between various components. It handles internal processes such as leader election and informer events to keep the state of the cluster consistent. API server 780 communicates with controller pod leader 785 and controller pod 790, providing them with updates regarding the cluster's state and helping to orchestrate the control loops that maintain the desired cluster configuration.

Controller pod 790 is responsible for managing control loops within the compute cluster, ensuring that the actual state of the system matches the desired state defined by the workloads. It continuously monitors the cluster's resources and works with the controller pod leader 785 to maintain pod health, restart failed pods, and ensure availability across the cluster.

Controller Pod Leader 785 is responsible for overseeing control loops within the compute cluster and ensuring the desired state of Kubernetes resources, such as pods, is maintained. The Controller Pod Leader communicates with the API server 780 to monitor the state of the cluster and receives informer events about changes in resources. Additionally, the Controller Pod Leader 785 communicates with the Node Management Service 710 to request node scaling operations, such as provisioning or decommissioning nodes, to accommodate changes in workload demand. This interaction enables dynamic scaling of the compute cluster's infrastructure, facilitating efficient resource management.

Node management service 710 is responsible for managing the lifecycle of nodes within the compute cluster 720, including provisioning, scaling, and decommissioning nodes. It acts as the interface between compute cluster 720 and compute provider 730, enabling dynamic scaling of resources based on workload demand. Node management service 710 includes controller backend 760, autoscaler 765, database 755, core 770, and gateway 775.

Controller backend 760 acts as the central coordination point for node management. It processes information from the controller pod leader 785 and forwards decisions to other components, such as the autoscaler 765. The controller backend 760 ensures that the system provisions or decommissions nodes in response to changing demands.

Autoscaler 765 dynamically adjusts the number of nodes in the cluster based on real-time metrics like CPU and memory usage. By scaling nodes up or down, autoscaler 765 ensures that the cluster has sufficient resources to meet the current workload demand while minimizing costs by removing excess nodes when they are not needed.

Database 755 stores information about the state of the cluster, including node configurations, metrics, and logs, allowing controller backend 760 to make informed decisions when managing node resources. Database 755 serves as the record-keeping component for node management service 710.

Core 770 is the primary processing engine that implements decisions from the controller backend 760 and autoscaler 765. It coordinates the actual scaling actions, such as provisioning new nodes or decommissioning idle nodes. Core 770 also ensures that nodes are healthy and operational before they are integrated into the cluster.

Gateway 775 functions as the communication interface between node management service 710 and compute provider 730. It is responsible for sending requests to the cloud-based provider to provision or release compute resources as determined by autoscaler 765 and core 770.

Compute provider 730 represents the infrastructure provider that supplies the computational resources (such as virtual machines) needed by compute cluster 720. The compute provider 730 can be any cloud-based service that integrates with gateway 775 to provision new nodes or release underutilized resources based on the current workload demands.

Figure 8:
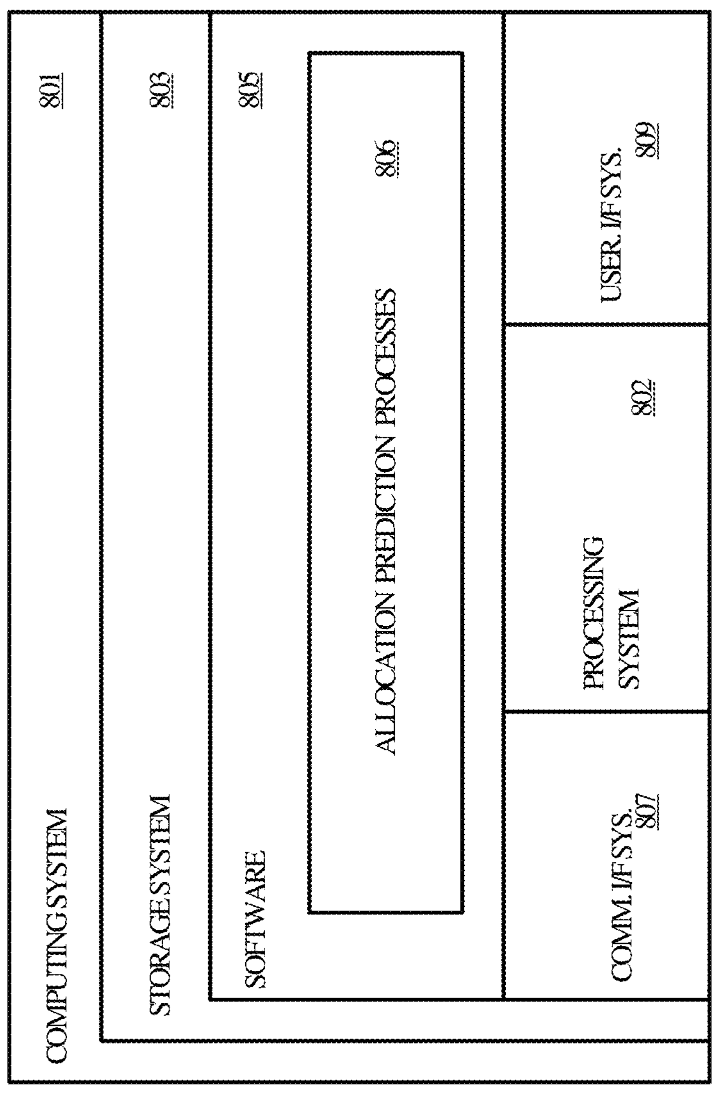
FIG. 8 illustrates a computing system suitable for implementing the various operational environments, architectures, environments, processes, scenarios, sequences, and frameworks discussed below with respect to the other Figures.

FIG. 8 illustrates computing system 801, which is representative of any system or collection of systems in which the various applications, processes, services, and scenarios disclosed herein may be implemented. Examples of computing system 801 include, but are not limited to server computers, web servers, cloud computing platforms, and data center equipment, as well as any other type of physical or virtual server machine, container, and any variation or combination thereof. (In some examples, computing system 801 may also be representative of desktop and laptop computers, tablet computers, and the like.)

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809. Processing system 802 is operatively coupled with storage system 803, communication interface system 807, and user interface system 809.

Processing system 802 loads and executes software 805 from storage system 803. Software 805 includes and implements allocation prediction processes 806, which are representative of the processes discussed with respect to the preceding Figures, such as processes 200, 400, 500, and 600. When executed by processing system 802, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may include a microprocessor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, microcontroller units, graphical processing units, application specific processors, integrated circuits, application specific integrated circuits, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including allocation prediction processes 806) may be implemented in program instructions and among other functions may, when executed by processing system 802, direct processing system 802 to operate as described with respect to the various operational scenarios, sequences, and processes illustrated herein. For example, software 805 may include program instructions for implementing node scaling processes and procedures as described herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," "in an implementation," "in some implementations," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S. C. § 112(f) will begin with the words "means for", but use of the term "for" in any other context is not intended to invoke treatment under 35 U.S. C. § 112(f). Accordingly, the applicant reserves the right to pursue additional claims after filing this application to pursue such additional claim forms, in either this application or in a continuing application.

What is claimed is:

1. A computer-implemented method for projecting resource allocation comprising:

maintaining a local cache associated with a node group in a compute cluster, the local cache comprising actual capacity data for a first set of instance types;

maintaining a global cache associated with a plurality of customers, the global cache including normalized capacity data for a second set of instance types;

determining to deploy a primary workload to a new instance in the compute cluster, wherein the new instance has a first instance type, and wherein the second set of instance types includes the first instance type;

projecting an allocatable capacity for the new instance based on historical capacity data, wherein the allocatable capacity comprises an amount of compute resources available for running the primary workload in the new instance after deployment of a supporting workload to the new instance, wherein the projecting the allocatable capacity comprises:

determining that the local cache does not include actual capacity data for the first instance type, and retrieving the normalized capacity data for the first instance type from the global cache; and associating the primary workload with the new instance upon determining that the projected allocatable capacity is sufficient for running the primary workload.

2. The computer-implemented method of claim 1 further comprising:

periodically obtaining customer data from the plurality of customers; and updating the global cache based on the customer data.

3. The computer-implemented method of claim 1 wherein the projected allocatable capacity comprises one or both of: projected processing capacity and projected memory capacity.

4. The computer-implemented method of claim 1, the method further comprising:

measuring the allocatable capacity of the new instance after deployment of the supporting workload; and adding the measured allocatable capacity of the new instance to the local cache in association with the first instance type.

5. The computer-implemented method of claim 1 wherein determining to deploy the primary workload to the new instance is based on a request from the compute cluster to scale resources.

6. The computer-implemented method of claim 1 wherein the supporting workload comprises one or more of: a node agent, an operating system, or a hypervisor.

7. A system comprising:

one or more processors; and one or more memories operably coupled to the one or more processors and having stored thereon software instructions that, upon execution by the one or more processors, cause the one or more processors to:

maintain a local cache associated with a node group a compute cluster, the local cache comprising actual capacity data for a first set of instance types;

maintain a global cache associated with a plurality of customers, the global cache including normalized capacity data for a second set of instance types;

determine to deploy a primary workload to a new instance in the compute cluster;

project an allocatable capacity for the new instance based on historical capacity data, wherein the allocatable capacity comprises an amount of compute resources available for running the primary workload in the new instance after deployment of a supporting workload to the new instance, wherein the new instance has a first instance type, and wherein the projecting the allocatable capacity comprises:

determining that the local cache does not include actual capacity data for the first instance type, determining that the global cache does not include normalized capacity data for the first instance type, and calculating the projected allocatable capacity using a predetermined formula; and associate the primary workload with the new instance upon determining that the projected allocatable capacity is sufficient for running the primary workload.

8. The system of claim 7, wherein wherein the software instructions comprise further instructions that, upon execution by the one or more processors, cause the one or more processors to:

periodically obtain customer data from the plurality of customers; and update the global cache based on the customer data.

9. The system of claim 7, wherein the projected allocatable capacity comprises one or both of: projected processing capacity and projected memory capacity.

10. The system of claim 7, wherein the software instructions comprise further instructions that, upon execution by the one or more processors, cause the one or more processors to:

measure the allocatable capacity of the new instance after deployment of the supporting workload; and add the measured allocatable capacity of the new instance to the local cache in association with the first instance type.

11. The system of claim 7, wherein determining to deploy the primary workload to the new instance is based on a request from the compute cluster to scale resources.

12. The system of claim 7, wherein the supporting workload comprises one or more of: a node agent, an operating system, or a hypervisor.

13. A computer-readable storage media device having program instructions stored thereon to facilitate projecting resource allocation for compute clusters, wherein the program instructions, upon execution by one or more processors, cause the one or more processors to:

determine to deploy a primary workload to a new instance in a compute cluster;

project an allocatable capacity for the new instance based on historical capacity data, wherein the allocatable capacity comprises an amount of compute resources available for running the primary workload in the new instance after deployment of a supporting workload to the new instance;

associate the primary workload with the new instance upon determining that the projected allocatable capacity is sufficient for running the primary workload;

measure the allocatable capacity of the new instance after deployment of the supporting workload, wherein the new instance has a first instance type;

determine that a local cache does not include actual capacity data for the first instance type; and add the measured allocatable capacity of the new instance to the local cache in association with the first instance type.

14. The computer-readable storage media device of claim 13, wherein the program instructions comprise further program instructions that, upon execution by the one or more processors, cause the one or more processors to:

maintain the local cache associated with a node group in the compute cluster, the local cache comprising actual capacity data for a set of instance types.

15. The computer-readable storage media device of claim 13, wherein the program instructions comprise further program instructions that, upon execution by the one or more processors, cause the one or more processors to:

maintain the local cache associated with a node group in the compute cluster, the local cache comprising actual capacity data for a first set of instance types; and maintain a global cache associated with a plurality of customers, the global cache including normalized capacity data for a second set of instance types including the first instance type, wherein the projecting the allocatable capacity comprises:

retrieving the normalized capacity data for the first instance type from the global cache.

16. The computer-readable storage media device of claim 13, wherein the program instructions comprise further program instructions that, upon execution by the one or more processors, cause the one or more processors to:

maintain the local cache associated with a node group the compute cluster, the local cache comprising actual capacity data for a first set of instance types; and maintain a global cache associated with a plurality of customers, the global cache including normalized capacity data for a second set of instance types, wherein the projecting the allocatable capacity comprises:

determining that the local cache does not include actual capacity data for the first instance type, determining that the global cache does not include normalized capacity data for the first instance type, and calculating the projected allocatable capacity using a predetermined formula.

17. The computer-readable storage media device of claim 13, wherein the program instructions comprise further program instructions that, upon execution by the one or more processors, cause the one or more processors to:

periodically obtain customer data from a plurality of customers; and update a global cache based on the customer data.

18. A computer-implemented method for projecting resource allocation comprising:

determining to deploy a primary workload to a new instance in a compute cluster;

projecting an allocatable capacity for the new instance based on historical capacity data, wherein the allocatable capacity comprises an amount of compute resources available for running the primary workload in the new instance after deployment of a supporting workload to the new instance;

associating the primary workload with the new instance upon determining that the projected allocatable capacity is sufficient for running the primary workload, wherein the new instance has a first instance type;

measuring the allocatable capacity of the new instance after deployment of the supporting workload;

determining that a local cache includes actual capacity data for the first instance type; and adding the measured allocatable capacity of the new instance to the local cache in association with the first instance type in response to determining that a difference between the measured allocatable capacity and the actual capacity data exceeds a threshold.

19. A computer-implemented method for projecting resource allocation comprising:

determining to deploy a primary workload to a new instance in a compute cluster;

projecting an allocatable capacity for the new instance based on historical capacity data, wherein the allocatable capacity comprises an amount of compute resources available for running the primary workload in the new instance after deployment of a supporting workload to the new instance; and associating the primary workload with the new instance upon determining that the projected allocatable capacity is sufficient for running the primary workload, wherein the new instance has a first instance type;

measuring the allocatable capacity of the new instance after deployment of the supporting workload;

determining that there is not a local cache associated with a node group in the compute cluster;

determining that a global cache includes actual allocatable capacity data for the first instance type, the global cache including normalized capacity data associated with a set of instance types including the first instance type;

determining that a difference between the measured allocatable capacity and the normalized capacity data for the first instance type exceeds a threshold;

creating a local cache for the compute cluster; and adding the measured allocatable capacity to the local cache in association with the first instance type.

* * * * *